United States Patent [19]

Kramer

[11] 4,088,858
[45] May 9, 1978

[54] STEERING COLUMN HAVING MANUAL LEVER FOR CONTROLLING TURN SIGNAL AND HEADLAMP DIMMER SWITCHES

[75] Inventor: Richard L. Kramer, Saginaw, Mich.

[73] Assignee: General Motors Corporation, Detroit, Mich.

[21] Appl. No.: 726,761

[22] Filed: Sep. 27, 1976

[51] Int. Cl.² .................... H01H 3/16; G05G 11/00
[52] U.S. Cl. .................... 200/61.27; 74/493; 200/61.54
[58] Field of Search .............. 200/61.27, 4, 61.54; 74/484 R, 493

[56] References Cited

U.S. PATENT DOCUMENTS

| | | | |
|---|---|---|---|
| 3,073,920 | 1/1963 | Barcus | 200/61.27 |
| 3,222,472 | 12/1965 | Elliott | 200/61.27 |
| 3,374,321 | 3/1968 | Trarbach | 200/61.27 |
| 3,421,386 | 1/1969 | Sippel | 74/493 |
| 3,510,839 | 5/1970 | Elliott et al. | 200/4 X |
| 3,604,975 | 9/1971 | Suzuki et al. | 200/61.54 |
| 4,006,328 | 2/1977 | Kimberlin | 200/61.54 |

*Primary Examiner*—James R. Scott
*Attorney, Agent, or Firm*—Charles R. White

[57] ABSTRACT

An adjustable steering column having a compact head is selectively tiltable with respect to an axis transverse of the column to suit the vehicle operator's requirements. The tilt head houses a manual lever movable in a first direction with respect to the head in any tilt position to actuate a vehicle turn signal switch mechanism within the head. The lever is further manually movable in a second direction with respect to the head in any tilt position or turn signal condition, to actuate a headlamp dimmer switch on the column remote from the head.

4 Claims, 7 Drawing Figures

STEERING COLUMN HAVING MANUAL LEVER FOR CONTROLLING TURN SIGNAL AND HEADLAMP DIMMER SWITCHES

BACKGROUND OF THE INVENTION

This invention relates to steering column assemblies for vehicles and more particularly to new and improved turn signal and headlamp dimmer switch control mechanisms housed in the adjustable head of a steering column and actuated by a single manual lever.

In the preferred embodiment of this invention, a single lever, providing manual control for turn signals and the headlamp dimmer switch, is employed on tiltable or tiltable and telescopic steering columns. This construction ties headlamp dimmer switch control with the lever for controlling the turn signals and thus conveniently places the headlamp dimmer control at the fingertips of the vehicle operator rather than on the vehicle floor board as is the more conventional practice. While single lever controls for turn signals and headlamp dimmer switches have been provided in some prior adjustable steering columns, they generally require bulky tilt heads to house the switches, the associated switch actuators as well as the ignition key cylinder and other components.

SUMMARY OF THE INVENTION

In contrast to the prior space-consuming constructions, this invention provides new and improved single-lever, switch-actuating construction for both the vehicle turn signal and headlamp dimmer switches that can be readily packaged in a compact manner in a space-saving, reduced-diameter, adjustable head. This invention allows the headlamp dimmer switch to be removed from the adjustable head and secured to the lower portion of the steering column. The invention provides for straight line actuator motion through the confined space and the tilt axis of the column to control the remotely located headlamp dimmer switch. With this invention both the turn signal and dimmer switches can be actuated in any tilt position of the adjustable head. Also, the dimmer switch can be readily actuated by the vehicle operator with the turn signal switch closed. For example, the turn signal switch can be in the left or right turn signal position and the dimmer switch can be actuated to condition the headlamp for high or low beam operation.

In this invention the turn signal switch is actuated through a special dual pivot and camming mechanism so that operating loads and space requirement of the manual lever are substantially reduced. With the manual lever connected to the dimmer switch through the dual pivot assembly, axial loading of this switch is minimized. By employing a secondary pivot for the turn signal switch actuator and connecting this actuator to the turn signal switch with a special cam and follower mechanism, the size of the tilt head envelope can be reduced resulting in improved space savings within the interior of the vehicle for greater operator convenience and comfort.

In the preferred embodiment of this invention, the single lever is mounted for movement in a plurality of planes by a dual pivot assembly which is supported for pivotal movement within the tilt head of a steering column assembly. The dual pivot assembly comprises a turn signal switch actuator which is mounted on bearing structure in the tilt head for limited pivotal movement about a longitudinal axis within the tiltable head of the steering column. The turn signal switch actuator turns the directional signal switch yoke on a pivot post through a cam and link mechanism to effect turn signal operation. A second major component of the dual pivot assembly comprises a headlamp dimmer switch actuator that is mounted for limited pivotal movement on the turn signal switch actuator by pivot means disposed at right angles to the turn signal switch actuator pivot. The dimmer switch actuator is independently and selectively operative to linearly move a slide member within the tiltable head which contacts a longitudinally movable rod mounted on a fixed jacket in the steering column. Appropriately matched and radiused contact surfaces on the rod and slide permit the tilting of these two components relative to each other and the linear actuation of the dimmer switch in any tilt position of the head and in turn signal condition.

These and other features, objects and advantages of this invention will be more apparent from the detailed description and drawings.

DESCRIPTION OF THE PREFERRED EMBODIMENT

Figures 1, 2:
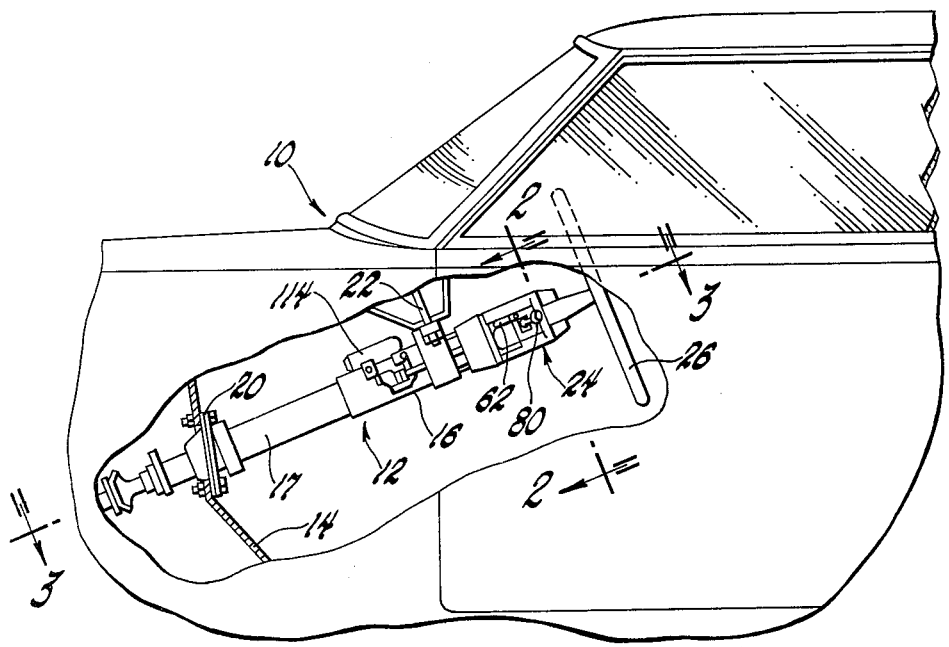
FIG. 1 is a fragmentary view of a vehicle body partially broken away incorporating a steering column and a single manual lever for operating the turn signal and headlamp dimmer switches.
FIG. 2 is an enlarged sectional view taken along line 2—2 of FIG. 1.

With particular reference to FIG. 1 of the drawing, there is shown a vehicle body 10 which has within its passenger compartment a steering column assembly 12 which projects forwardly through a fire wall 14 into connection with the vehicle steering gear in the engine compartment. The steering column 12 includes upper and lower jackets 16 and 17 with the lower jacket secured to fire wall 14 by bracket 20 and the upper jacket 16 secured to the instrument panel by bracket 22. The steering column incorporates an angularly tiltable head 24 having a steering wheel 26 operatively mounted at the upper end thereof. The head 24 and connected steering wheel are adjustable as a unit to predetermined angular positions to facilitate vehicle entrance and exit by the driver and to maximize driver comfort by permitting the driver to place the steering wheel at a convenient angle when driving the vehicle. The steering wheel is operatively connected to an angularly adjustable steering shaft 28 of a steering shaft assembly 30 that extends axially within the steering column assembly 12. The steering shaft assembly 30 includes a lower steering shaft 32 operatively connected to the upper steering shaft by universal joint 34, which permits the upper steering shaft to be angularly adjusted with respect to the lower steering shaft 32. The lower steering shaft is operatively connected to the steering gear, not shown, so that the steering wheel 26 can be turned to steer the dirigible wheels of the vehicle. The upper end of the lower steering shaft 32 projects axially through a generally cylindrical support assembly 36 which is secured by screws 38 to a retainer (not illustrated) connected to the upper jacket 16. A cylindrical bearing housing 40 is mounted on the upper steering shaft 28 by anti-friction bearings 42 and 44 and projects forwardly to a terminal position around the support assembly 36. The bearing housing 40 is connected to the support assembly 36 by pivot pins 46 and 48 (FIG. 3) so that the tilt head 24 can be pivoted to a limited extent with respect to the tilt axis provided by these pivot pins.

Figure 4:
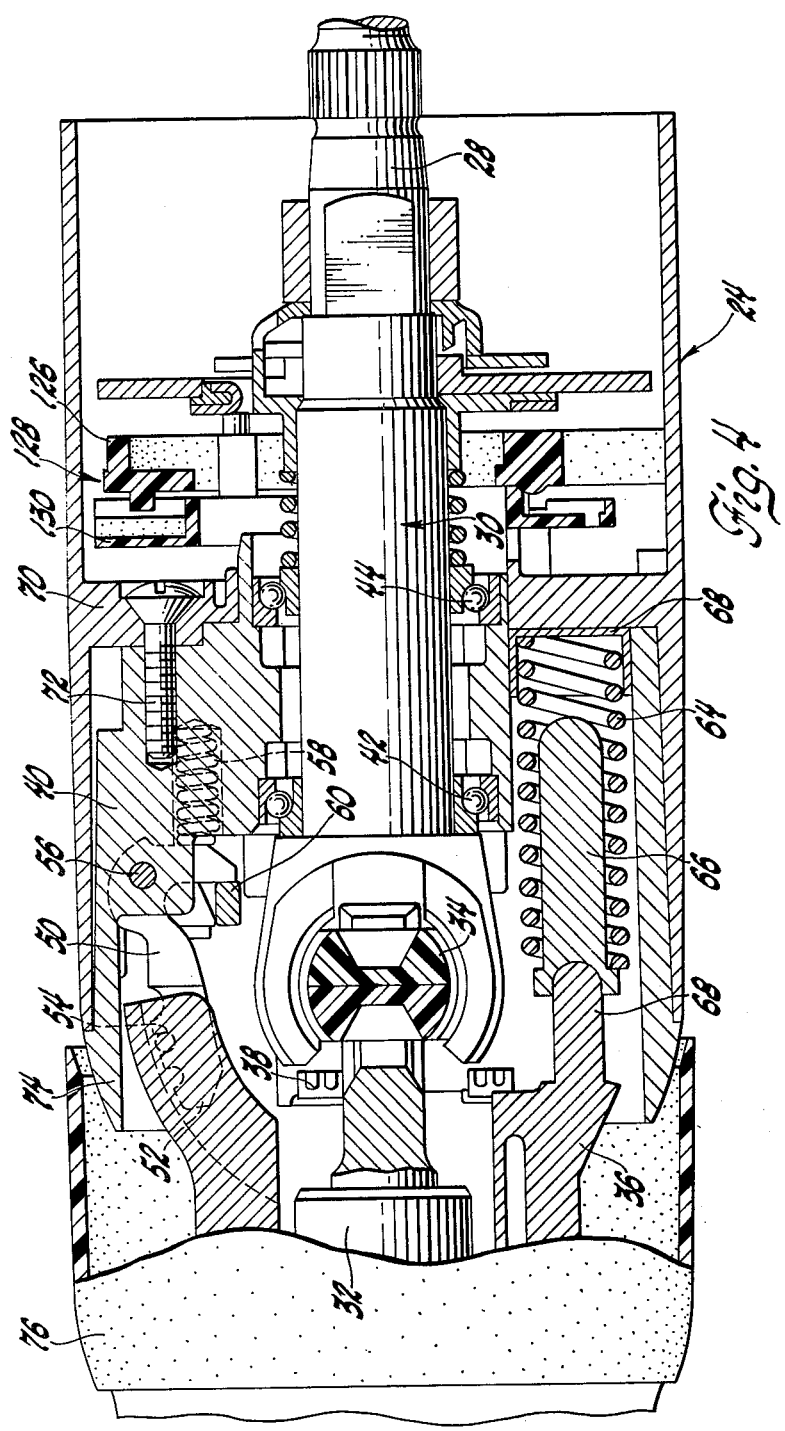
FIG. 4 is a sectional view taken along line 4—4 of FIG. 3.

The bearing housing 40 contains a pair of identical locking shoes of which only locking shoe 50 is shown. Each shoe has a longitudinally extending and toothed locking portion 52 for selectively engaging a lock pin 54 secured in the support assembly 36. The locking shoes are generally L-shaped in side view and are pivotally mounted to the bearing housing 40 by a pivot 56. Each locking shoe has a depending leg which is engaged by a helical spring, such as spring 58 seated in the bearing housing 40 that urges the associated shoe towards engagement with the locking pin. When the pin 54 is engaged with one of the teeth of either one of the locking shoes, the angular setting between the bearing housing 40 and the support assembly 36 is fixed. The locking shoes may be moved from engagement with the locking pin 54 by actuation of a shoe release lever 60 that is pivotally mounted to the bearing housing 40 by a suitable pivot such as disclosed in copending application Ser. No. 595,624, filed July 14, 1975 now U.S. Pat. No. 4,029,168, for "Steering Column Lock Inhibitor" whose disclosure is incorporated by reference. Lever 60 has an inner side which directly contacts the depending leg of the locking shoe so that a tilt lever 62 fixed to one end of the shoe release lever and extending from the steering column assembly can be manually actuated by the vehicle operator to swing the shoe 50 in a counterclockwise or release direction in FIG. 4. This moves the locking shoe away from locking engagement with the pin 54 so that the tilt head can be moved to a different angular setting. On release of lever 62 the springs 58 bias the shoes into the locking position and one of the tooth spaces mates with locking pin 54.

A large compression spring 64 is employed to urge the tiltable head 24 of the steering column upwardly and about the axis of pivot pins 46, 48 when tilt lever 62 is actuated and the locking shoes are released from pin 54. When the desired tilt position is obtained, the lever 62 is released and locking shoes and cooperating pins hold the tilt head in the adjusted position. The compression spring 64 is mounted on a spring guide 66 seated on an extended protuberance 68 of the support assembly 36. Spring 66 projects axially through a bore in bearing housing 40 and into engagement with a cup-like spring retainer 68. This spring retainer 68 is secured in housing 40 by a suitable fastener means (not shown) below the radial wall of a cylindrical outer housing 70 of the upper head 24. This housing is attached to the bearing housing 40 by screws 72 which are threaded into the bearing housing 40. The cylindrical outer wall of housing 70 extends around the outside of the bearing housing 40 and terminates short of the inwardly tapered end 74 of the bearing housing 40 which projects into the end of a cylindrical shroud 76 that is rigidly secured to the upper mast jacket 16.

Figure 3:
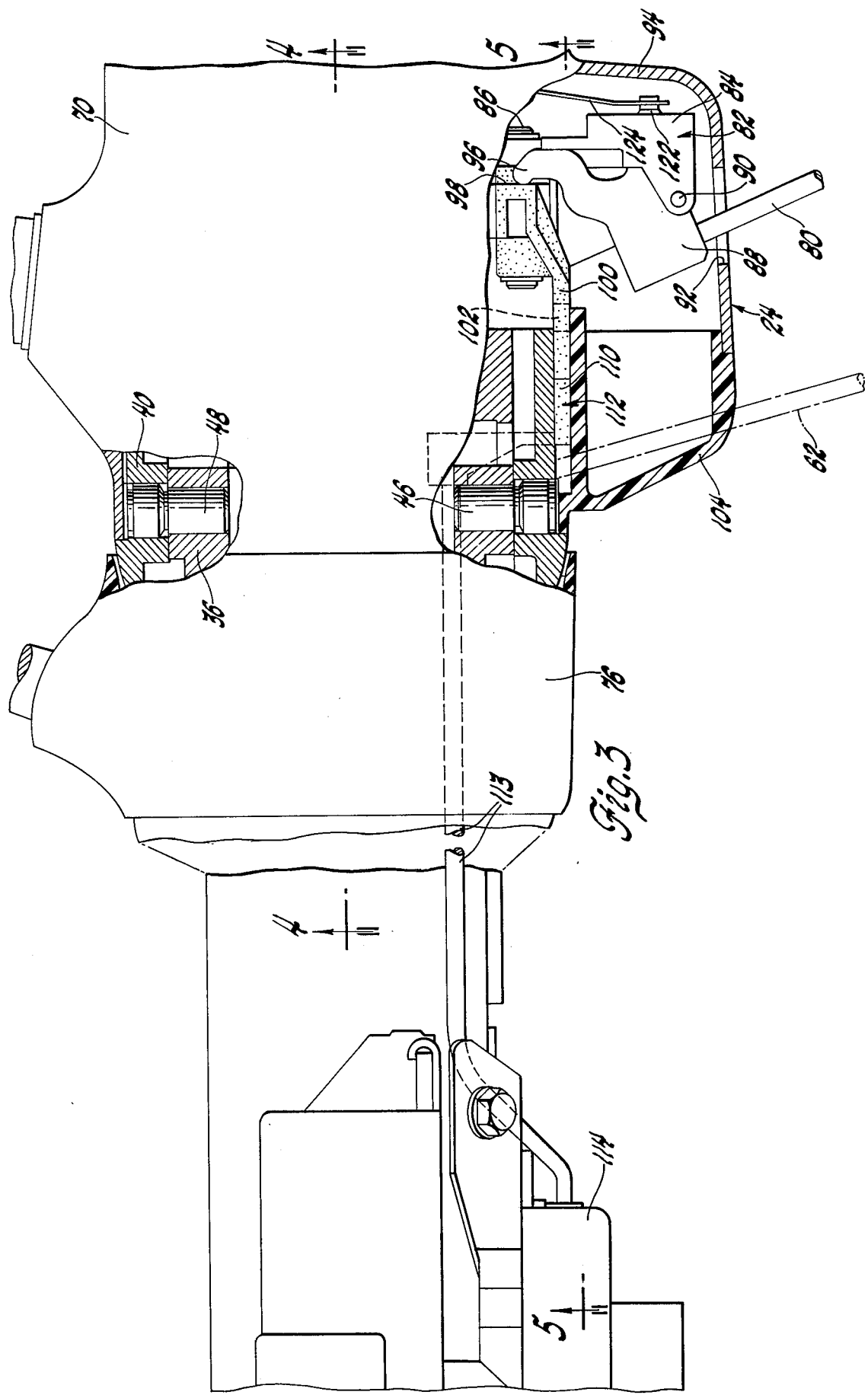
FIG. 3 is a longitudinal view partly in section taken generally along line 3—3 of FIG. 1.

In addition to supporting the tilt lever 62 and the associated adjusting mechanism, the head 24 incorporates unique construction for actuating the turn signal and headlamp dimmer switches. As best shown in FIGS. 2 and 3, there is a control lever 80, mounted immediately above the tilt control lever 62, which is employed to actuate both the turn signal and headlamp dimmer switches in any adjusted position of the tilt head 24.

Control lever 80 is supported by a special double-axis pivot assembly 82 for selective pivotal movement in a first plane for directional signal actuation and in a second plane at right angles to the first plane for headlamp dimmer switch actuation. More particularly, the pivot assembly comprises a turn signal switch actuator 84 mounted for limited turning movement with respect to longitudinally extending pivot 86 secured to support structure 87 within the housing 70. A dimmer switch actuator 88 is pivotally mounted on the turn signal switch actuator 84 by a pivot 90 which extends transversely with respect to pivot 86.

The control lever 80 has its inner end threaded or otherwise secured in the dimmer switch actuator and projects therefrom through an opening 92 in a protuberance or bump 94 formed in cover 70 so that it can be manually manipulated by the vehicle operator. The inner end of the dimmer switch actuator has a finger portion 96 which engages an upper contact surface 98 of a dimmer rod slide 100 that is mounted for longitudinal sliding movement on a guide 102 projecting inwardly from an internal wall of a plastic cover member 104 which is removably secured to cylindrical housing 70. The slide 100 has a lower end portion formed with a curved contact surface 108 which matches and fits on the curved outer surface 109 of head 110 of a dimmer switch rod assembly 112. This assembly has a rod portion which extends downwardly from head 110 along the outer wall of the upper jacket 16 into engagement with headlamp dimmer switch 114 fixed to jacket 16. A spring means (not shown) within the dimmer switch 114 urges the rod 113 to an up position ready for actuation by slide 100.

The turn signal switch actuator 84 is formed with an arcuate camming groove 120 in the upper surface thereof which receives a follower 122 depending from the end of a connector arm 124 that extends inwardly into housing 70 and has its inner end fixed to a movable yoke 126 of a turn signal switch assembly 128. This assembly has a base member 130 fixed to the housing 70 that carries the contacts for the turn signals (not illustrated). The yoke 126 is pivotally connected to the base member by a pivot post for limited turning movement about axis 131 shown in FIG. 2. U.S. Pat. No. 3,510,839 to H. V. Elliott et al issued May 5, 1970 describes and illustrates a turn signal switch assembly with a fixed base and pivoted yoke and switch details which may be employed in this invention, and this patent disclosure is hereby incorporated by reference into this specification. Threaded fastener 133 rigidly secures the flattened rectangular end 134 of connector arm 124 in a corresponding groove formed in the yoke so that movement of the arm 124 will turn the yoke of the turn signal assembly relative to the base member to effect appropriate electrical energization of the turn signals.

In the event that the vehicle operator desires to actuate the turn signal for left or right turn indication, the lever 80 can be manually turned to rotate the pivot assembly 82 in a clockwise or counterclockwise direction depending on the directional indication desired. For example, a right turn signal can be made by moving the lever 80 in a clockwise direction to turn the signal switch actuator 84 clockwise on pivot 86. With this movement of switch actuator 84 and with the follower 122 riding in the cam groove 120, arm 124 is pivoted on the pivot post and in effect moves from the off position indicated by radial line *a* to radial line *b*. Since arm 124 is rigidly secured to the yoke 126, it is accordingly rotated on the pivot post in a clockwise direction to close the circuitry such as that shown in the Elliott et al U.S. Pat. No. 3,510,839 referenced above for the right turn signal. During this turn signal action, the finger 96 of the dimmer switch actuator has merely moved over the upper surface 98 of the signal switch slide 100 without depressing the slide so that the dimmer switch is not actuated.

In the event that a left turn signal is desired the lever 80 is turned in a counterclockwise direction which causes the turn signal switch actuator 84 to move in a corresponding direction. This action turns arm 124 downwardly about pivot axis 131 to radial line *c* through the action of the camming groove 120 on the follower 122 riding in the groove. The yoke 126 is thus turned counterclockwise to close the circuitry for the left turn signal.

Figure 5:
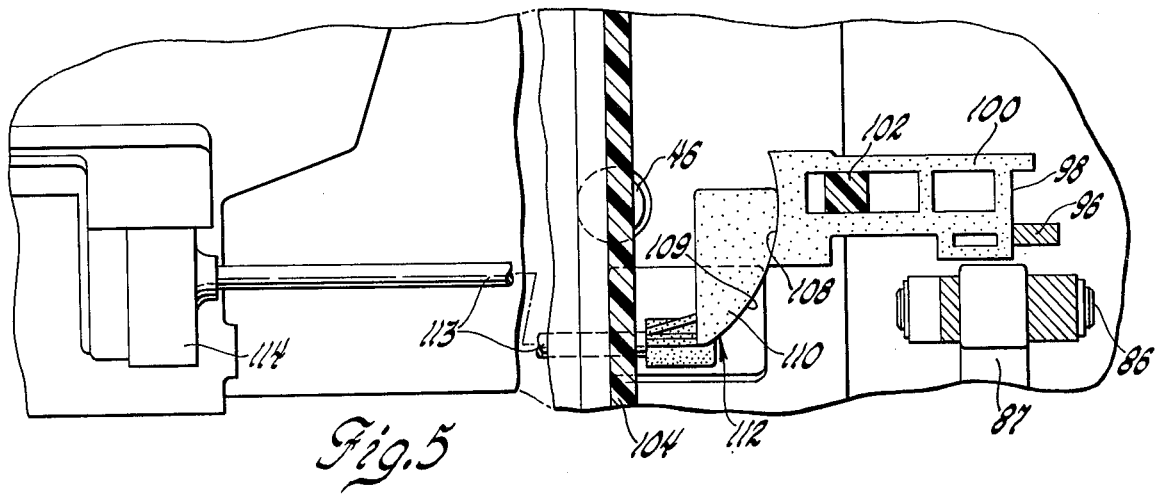
FIG. 5 is a view partly in section taken along line 5—5 of FIG. 3.
Figure 6:
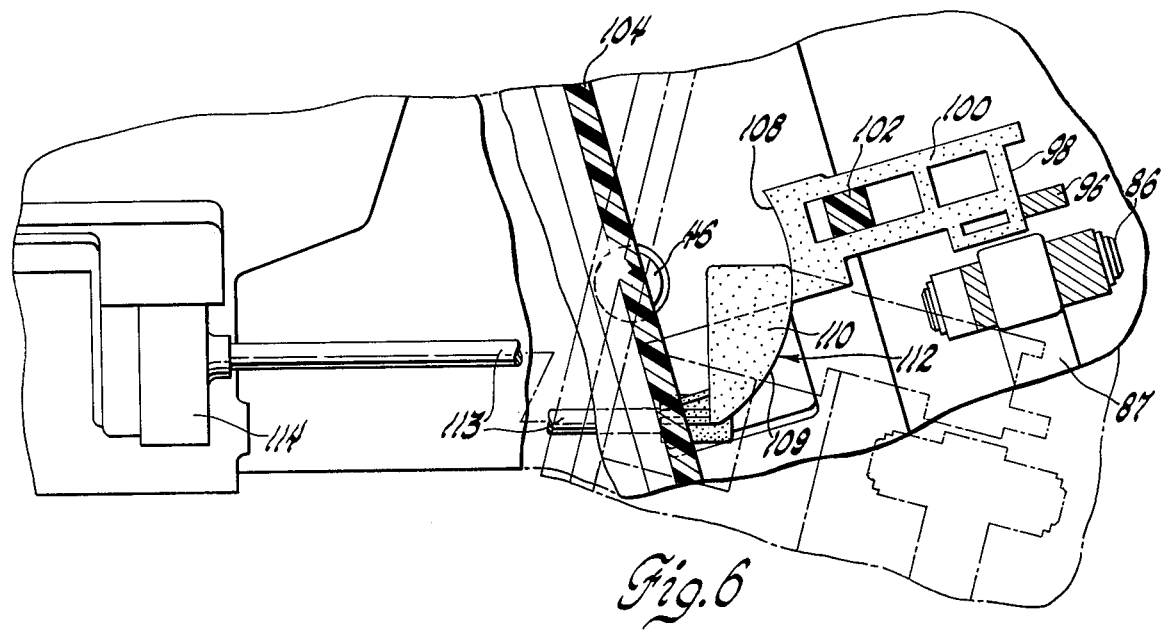
FIG. 6 is a view similar to FIG. 5 showing the tilt head of the steering column moved to an adjustable position.
Figure 7:
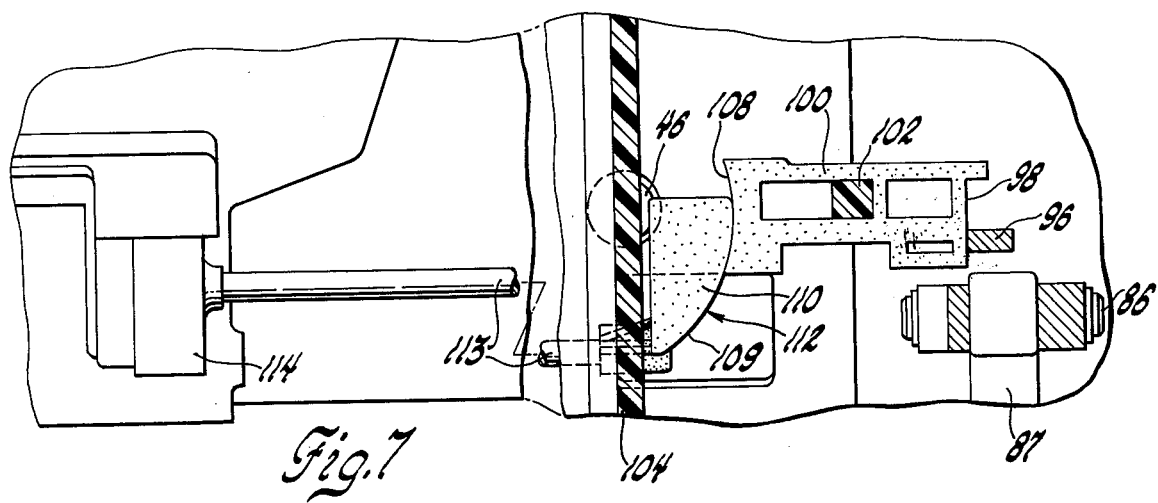
FIG. 7 is a view similar to the view of FIG. 5 showing actuation of a column mounted headlamp dimmer switch.

In the event that it is desired to actuate the dimmer switch, at any tilt position of the steering wheel, the operator can pull upwardly on the lever 80 to rotate the dimmer switch actuator 88 on pivot 90. The finger of the actuator 96 pushes on the upper surface 98 of the slide 100 and causes the slide to move downwardly and push on the head 110 of the dimmer switch rod assembly 112. As shown, the head 110 moves from the FIG. 5 position to the FIG. 7 position to activate the switch 114 to change the headlamp operation between high and low beam. This is accomplished without high force manual loading of the switch so that service life is increased. FIG. 6 illustrates an important feature of this invention and shows how the head assembly can be tilted in any position and still activate the dimmer switch rod assembly with linear motion through the tilt axis. With this construction, the curved surface 108 on the slide maintains contact with the corresponding surface 109 of the head of the dimmer switch rod assembly in any tilt position of the head so that the dimmer switch rod can be displaced in a linear manner to actuate the dimmer switch.

From the above it will be appreciated that this invention provides a unique dual-pivot construction for actuating both the turn signal and dimmer switch in a tilt steering column by a single lever without manual loading of the switches and further provides for a compact package which provides increased space for the operator.

While a preferred embodiment of this invention has been shown and described to illustrate the invention, other embodiments will now become apparent to those skilled in the art. Accordingly, this invention is not limited to the particular embodiments described, but only by the following claims.

What is claimed is:

1. In a tilt steering column for a vehicle, jacket means forming a first portion of said steering column, a tiltable housing forming a second portion of said steering column, support means secured to said jacket means, pivot means interconnecting said housing to said support means for limited pivotal movement about an axis extending transversely of said jacket means, articulated steering shaft means extending through said jacket means and said housing, a steering wheel secured to the upper end of said steering shaft means, first switch means mounted in said housing, second switch means secured to said steering column remote from said tiltable housing, first operator means pivotally mounted to said housing for limited movement about a first axis for actuating said first switch means and second operator means mounted to said first operator means for pivotal movement about a second axis transverse to said first axis, rod means interconnecting said second switch means and said second operator means, and lever means operatively connected to said second operator means and rotatable in a first direction to turn said first and second operator means so that said first operator means actuates only said first switch means and rotatable in a second direction to turn only said second operator means to activate said rod means and said second switch means.

2. In a tilt steering column for a vehicle, jacket means forming a fixed portion of said steering column, a tiltable housing forming a movable portion of said steering column, support means secured to said jacket means, pivot means interconnecting said housing to said support means for limited pivotal movement about an axis extending transversely of said jacket means, articulated steering shaft means extending through said jacket means and said housing, said steering shaft means comprising upper and lower steering shafts and a pivot interconnecting said steering shafts, said upper and lower steering shafts extending respectively in said jacket means and said tiltable housing, a steering wheel secured to the upper steering shaft, first switch means mounted in said housing, second switch means secured to said steering column remote from said tiltable housing, first operator means pivotally mounted to said housing for limited movement about a first axis for actuating said first switch means and second operator means mounted to said first operator means for pivotal movement about a second axis transverse to said first axis, elongated rod means operatively connected to said second switch means having a curved head portion at the free end thereof, a slide member mounted for linear movement in said tiltable housing and having a curved contact portion for contacting said head portion of said rod means in any tilt position of said housing, said slide being linearly movable by said second operator means, and lever means operatively connected to said second operator means and rotatable in a first direction to turn said first and second operator means so that said first operator means actuates only said first switch means and rotatable in a second direction to turn only said second operator means to activate said rod means and said second switch means.

3. A steering column for a motor vehicle comprising an elongated tubular jacket means, rotatable lower steering shaft means extending longitudinally within said jacket means, rotatable upper steering shaft means extending out of said jacket means, pivot means interconnecting said upper and lower steering shaft means, a manual steering wheel operatively connected to said upper steering shaft means for turning said upper and lower steering shaft means, a turn signal housing disposed around said upper steering shaft means and located between said steering wheel and said jacket means, pivot means mounting said turn signal housing to said jacket means for turning movement about a pivot axis transverse to said jacket means, means for latching said steering wheel, said upper steering shaft means and said turn signal housing at a plurality of tilt positions with respect to said jacket means, a dimmer switch for electrically energized headlamps for said vehicle secured to said jacket means, a rod operatively connected to said dimmer switch and extending longitudinally with respect to said jacket means and terminating in a curved head portion within said turn signal housing, a rod actuating slide mounted for linear movement in said turn signal housing and having a curvilinear contact surface complementary to and engaging the curved head portion of said dimmer switch rod to permit tilting movement of said turn signal housing relative to said mast jacket, a turn signal switch in said turn signal housing, first switch actuator means mounted for turning movement in said turn signal housing about a first axis and operatively connected to said turn signal switch, second switch actuator means connected to said first switch actuator means for pivotal movement about an axis transverse to said first axis, and lever means connected to said second switch actuator and extending outwardly of said turn signal housing and manually movable in a first direction to rotate said first switch actuator means to actuate said turn signal switch means and being further movable in a second direction transverse to said first direction to actuate said slide and thereby said rod and said dimmer switch connected thereto.

4. A steering column for a motor vehicle comprising an elongated tubular mast jacket, rotatable lower steering shaft means extending longitudinally within said mast jacket, rotatable upper steering shaft means extending out of said mast jacket, first pivot means interconnecting said upper and lower steering shaft means, a manual steering wheel operatively connected to said upper steering shaft means for turning said upper and lower steering shaft means, a turn signal housing disposed around said upper steering shaft means and located between said steering wheel and said mast jacket, second pivot means aligned with said first pivot means mounting said turn signal housing to said mast jacket for turning movement about a pivot axis transverse to said mast jacket, means for latching said steering wheel, said upper steering shaft means and said turn signal housing at a plurality of tilt positions with respect to said mast jacket, a vehicle headlamp dimmer switch secured to said mast jacket remote from said turn signal housing, a rod operatively connected to said dimmer switch and extending longitudinally with respect to said mast jacket and terminating in a curved head portion, a rod actuating slide mounted for linear movement in said turn signal housing having a curvilinear contact surface complementary to and engaging the curved head portion of said rod to permit tilting engagement of said turn signal housing relative to said mast jacket, a turn signal switch operatively mounted in said turn signal housing, first switch actuator means mounted for turning movement in said turn signal housing about a first axis and operatively connected to said turn signal switch, second switch actuator means connected to said first switch actuator means for pivotal movement about an axis transverse to said first axis, said second switch actuator having a contact portion slidably engaging an end portion of said rod actuating slide, and an elongated manual lever connected to said second switch actuator and extending outwardly of said turn signal housing and manually movable in a first direction to rotate said first switch actuator means to actuate said turn signal switch means and being further movable in a second direction transverse to said first direction to actuate said rod and said dimmer switch connected thereto.

* * * * *